(12) United States Patent
Dmitriev et al.

(10) Patent No.: US 10,331,009 B2
(45) Date of Patent: Jun. 25, 2019

(54) COMPACT OPTICAL KEY BASED ON A TWO-DIMENSIONAL PHOTONIC CRYSTAL WITH 120 DEGREE FOLDING

(71) Applicant: Universidade Federal do Para—UFPA, Belem (BR)

(72) Inventors: Victor Dmitriev, Belem (BR); Gianni Masaki Tanaka Portela, Belem (BR); Raphael Rafsandjani Batista, Belem (BR)

(73) Assignee: UNIVERSIDADE FEDERAL DO PARA—UFPA (BR)

( * ) Notice: Subject to any disclaimer, the term of this patent is extended or adjusted under 35 U.S.C. 154(b) by 0 days.

(21) Appl. No.: 15/313,133

(22) PCT Filed: May 22, 2015

(86) PCT No.: PCT/BR2015/050061
§ 371 (c)(1),
(2) Date: Nov. 22, 2016

(87) PCT Pub. No.: WO2015/176150
PCT Pub. Date: Nov. 26, 2015

(65) Prior Publication Data
US 2017/0123288 A1 May 4, 2017

(30) Foreign Application Priority Data

May 22, 2014 (BR) .......................... 102014016549

(51) Int. Cl.
*G02B 6/35* (2006.01)
*G02F 1/095* (2006.01)
*G02F 1/313* (2006.01)

(52) U.S. Cl.
CPC ............. *G02F 1/3133* (2013.01); *G02B 6/35* (2013.01); *G02F 1/095* (2013.01); *G02F 1/313* (2013.01);
(Continued)

(58) Field of Classification Search
CPC ............. G02F 2203/15; G02F 2202/32; G02F 2201/06; G02F 1/3132; G02F 1/3133; G02F 1/365
(Continued)

(56) References Cited

U.S. PATENT DOCUMENTS

| 7,428,352 B2 | 9/2008 | Noda et al. ............. G02B 6/26 |
| 2005/0249455 A1 | 11/2005 | Shirane et al. .......... G02B 6/26 |
| 2008/0267557 A1* | 10/2008 | Wang .................... B82Y 20/00 385/16 |

FOREIGN PATENT DOCUMENTS

| CN | 101571657 | 11/2009 | ............. G02F 1/361 |
| JP | 2003215646 | 7/2003 | ............... G02B 6/12 |
| JP | 2006184618 | 7/2006 | ............... G02B 6/12 |

OTHER PUBLICATIONS

"Possible mechanisms of switching in symmetrical two-ports based on 2D photonic crystals with magneto-optical resonators" article written by Victor Dmitriev, Gianni Portela, Daimam Zimmer published in Optics Letters, vol. 38, No. 20, dated Oct. 15, 2013 (4 pages).

(Continued)

*Primary Examiner* — Michael P Mooney
(74) *Attorney, Agent, or Firm* — Hayes Soloway P.C.

(57) ABSTRACT

The present invention is based on a two-dimensional photonic crystal where are inserted defects that originate two waveguides and one resonant cavity. An electromagnetic signal that crosses the device is confined in the interior of the defects, due to the photonic band gap associated with the periodic structure that surrounds it. Its main function is the (Continued)

Figure 1A:
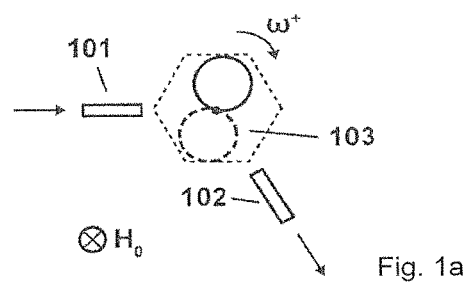

control of the flux of an electromagnetic signal over a communication channel, blocking (state off) or allowing (state on) the passage of the signal. It also promotes the change in the propagation direction of an electromagnetic signal by an angle of 120 degrees, providing greater flexibility in the design of integrated optical systems. The working principle of the device is based on the excitation of dipole modes in its resonant cavity, accordingly to the application of an external DC magnetic field on the magneto-optical material that constitutes it. In states on and off the magneto-optical material is magnetized and nonmagnetized, respectively.

8 Claims, 3 Drawing Sheets

(52) U.S. Cl.
CPC ...... *G02F 2201/06* (2013.01); *G02F 2202/32* (2013.01)

(58) Field of Classification Search
USPC .................... 385/16, 23, 39, 50, 129, 132, 6
See application file for complete search history.

(56) References Cited

OTHER PUBLICATIONS

International Preliminary Report on Patentability issued in corresponding PCT Application Serial No. PCT/BR2015/050061, dated Nov. 22, 2016 (6 pages).
International Search Report issued in corresponding PCT Application Serial No. PCT/BR2015/050061 dated Jul. 15, 2015, with English translation (5 pages).
Written Opinion of the International Search Authority issued in corresponding PCT Application Serial No. PCT/BR2015/050061 dated Jul. 17, 2015 (5 pages).

* cited by examiner

COMPACT OPTICAL KEY BASED ON A TWO-DIMENSIONAL PHOTONIC CRYSTAL WITH 120 DEGREE FOLDING

The present invention refers to a compact optical switch based on a two-dimensional photonic crystal with 120 degree bending. It can be used mainly to control the propagation of an electromagnetic signal along a channel in integrated optical systems, allowing or blocking the passage of the signal (switching function).

The development of new devices based on photonic crystals is influenced by the need for devices with smaller dimensions, so that higher levels of integration density of components in integrated optical systems are achieved.

Photonic crystals are structures in which occurs the periodic modulation of electric permittivity or magnetic permeability of the materials that constitute them. This periodicity is related to the existence of a forbidden frequencies band in the band diagram of these structures, also known as photonic band gap.

Electromagnetic waves with frequency situated in this range cannot propagate throughout the crystal, being fully reflected by it. The creation of defects in the crystalline periodic structure, together with the existence of the photonic band gap, is associated with the working principle of most devices based on photonic crystals.

Among the various devices used in integrated optical systems, the switches have a fundamental role. They operate in two states, which are: state off, in which there is high isolation between the input and output ports of the switch, with consequent impediment of electromagnetic signals transmission; state on, in which occurs the transmission of electromagnetic signals from input to output, with low insertion losses. The transition between the two operating states on photonic crystals based switches is controlled by the modification of a characteristic parameter of the crystal in accordance with the control of an external variable to the structure.

The development of new optical switches based on photonic crystals have been described in various descriptive reports of invention patents, among which stand out those described below.

The switch referred in patent CN101571657 is based on a two-dimensional photonic crystal consisting of a triangular lattice of holes inserted into a material with nonlinear properties. Defects in the crystalline structure originate two waveguides (input and output) and one resonant cavity. The refractive index of the nonlinear material can be modified by the incidence of an optical control signal and this phenomenon is known as Kerr effect. The state in which the switch is (on or off) depends on the intensity of this control signal.

The switch described in patent US2005249455 is based on an optical waveguide whose core is formed by a two-dimensional photonic crystal. The refractive index of the materials that comprise the crystal can be modified by injecting an optical signal or by applying an electric current between two electrodes present in the structure. The transition between the operating states of the device is controlled by setting the value of the refractive index of the materials that comprise the referred photonic crystal.

Also noteworthy is the switch described in patent JP2003215646. Between two optical waveguides is inserted an element responsible for the switching (transition between states on and off). This element is based on a two-dimensional photonic crystal and a pair of electrodes. The state in which the switch operates (on or off) is determined by the value of the refractive index of the materials that comprise the crystal, which in turn is dependent on the value of a voltage applied between the electrodes.

On the other hand, the optical switch referred in patent JP2006184618 is based on a two-dimensional photonic crystal consisting of a material whose refractive index varies in accordance with temperature. The temperature control of the device is responsible for setting the state in which the switch operates (on or off).

Therefore, there are several ways to control the transition between the operating states of an optical switch based on photonic crystals. The present invention is based on a two-dimensional photonic crystal consisting of a triangular lattice of holes inserted in a magneto-optical material. The two operating states of the switch are defined by the value of the DC magnetic field applied on the magneto-optical material, which is equal to 0 in state off and equal to $H_0$ in state on.

Typical waveguides for operation in the optical frequency band are optical fibers. Their bending angle is very limited and this is one of the main difficulties to be overcome in optical fiber-based circuits. Their functioning is based on the principle of total internal reflection and, consequently, they cannot be bent so sharp, and this complicates their use in circuits that require sharp changes in the propagation direction of electromagnetic signals.

This difficulty can be overcome with the use of optical waveguides based on the photonic crystals technology. In these waveguides, the correct choice of the topology of curves associated with them can promote the change in propagation direction of an electromagnetic signal. This is because these devices are based on the existence of photonic band gap, unlike fiber optics, which are based on the principle of total internal reflection.

The photonic crystals based waveguides are built, generally, by inserting linear defects in the crystalline structure. Due to the photonic band gap associated with the crystalline structure nearby the defect, electromagnetic signals with frequency in this range are confined inside the linear defect, propagating along that.

The switch referred in this report incorporates, in its structure, a 120 degree bending of the propagation direction of an electromagnetic signal, providing flexibility in the design of integrated optical systems. In addition, due to its reduced dimensions, it favors the increase of the integration density of components in these systems.

The magnetization circuit is simplified because the device operates with uniform magnetization in state on. Due to this, an electromagnet can be used for the fulfillment of this function. The intensity of the magnetic field generated by the electromagnet is proportional to the electric current flowing in it.

Among the performance characteristics of the referred device, it is worth mentioning the high isolation between the input and output ports in state off, the low insertion losses in state on and the high bandwidth of operation.

In general, the switch in question consists of a two-dimensional photonic crystal based on a triangular lattice of holes etched in a material with magneto-optical properties. In the crystalline structure, two types of defects are inserted, namely:

a) Linear defects: created by removing holes in a straight line, which form the waveguides of the device;

b) Local defects: created by modifying the radius and position of holes located in the center of the device, which form the resonant cavity of the device.

Depending on magnetic field in the magneto-optical resonator, the switch can operate in two states, namely:

a) The magneto-optical material is nonmagnetized and there is no signal transmission to the output waveguide;

b) The magneto-optical material is magnetized and it occurs the signal transmission to the output waveguide.

Specifically, the switch has the following features:

a) The lattice constant of the photonic crystal (a) depends on the operating wavelength ($\lambda$) or the central frequency of the operating frequency band of the device. For $\lambda$ equal to 1.55 micrometers, the value of a is equal to 480 nanometers and the ratio a/$\lambda$ is equal to 0.3097;

b) The radius of the holes etched in the magneto-optical material, which originate the Crystal, is equal to 0.3a;

c) The input and output waveguides are created by inserting two linear defects in the photonic crystal;

d) The resonant cavity is produced by inserting local defects in the center of the device, between the input and output waveguides;

e) An electromagnetic signal transferred from the input to the output of the switch has its propagation direction altered by an angle of 120 degrees;

f) The operating state (on or off) in which the device works is dependent on the application of an external DC magnetic field on the magneto-optical material;

g) In state off, the applied external DC magnetic field is equal to 0 and an electromagnetic signal applied on the input waveguide excites a stationary dipole mode on the resonant cavity, so that the nodes of the mode are aligned with the output waveguide and, consequently, there is no transfer of the signal from the input to the output;

h) In state on, the applied external DC magnetic field is equal to $H_0$ and an electromagnetic signal applied on the input waveguide excites a rotating dipole mode in the resonant cavity, with the consequent transfer of the input signal to the output;

i) The magneto-optical material in which is based the device is anisotropic. The electric permittivity and the magnetic permeability of the material are described by the following expressions:

$$[\varepsilon] = \varepsilon_0 \begin{pmatrix} 6.25 & -ig & 0 \\ ig & 6.25 & 0 \\ 0 & 0 & 6.25 \end{pmatrix} ; \mu = \mu_0$$

Where:
a) $\varepsilon$ is the electric permittivity of the material (in Farads per meter);
b) $\varepsilon_0$ is the electric permittivity of the free space (in Farads per meter);
c) $\mu$ is the magnetic permeability of the material (in Henrys per meter);
d) $\mu_0$ is the magnetic permeability of the free space (in Henrys per meter);
e) i is the imaginary unit;
f) g is a parameter dependent on the applied external DC magnetic field intensity.

In the following, figures that illustrate the operation of the device are presented, as well as is described, in details, the developed switch.

Figure 1B:
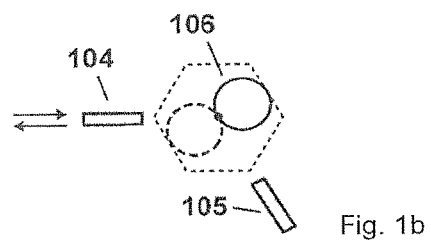

FIGS. 1a and 1b present, in a simplified way, the switch operating in states on and off, respectively.

Figure 2A:
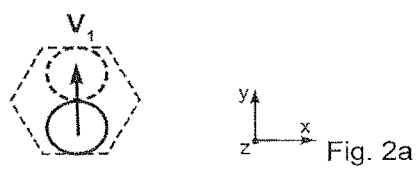
Figure 2B:
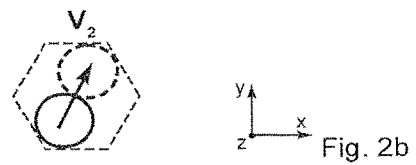
Figure 2C:
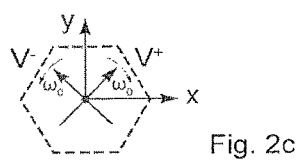
Figure 2D:
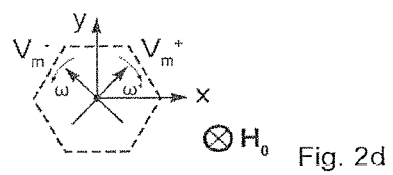

FIGS. 2a and 2b show the eigenvectors $V_1$ and $V_2$, respectively, which are associated with two of the six existing dipole modes in the nonmagnetized resonator, with resonant frequency $\omega_0$. FIG. 2c presents the modes $V^+$ and $V^-$ of the nonmagnetized resonator, rotating in opposite directions and having the same resonant frequency $\omega_0$. FIG. 2d shows the modes $V_m^+$ and $V_m^-$ of the magnetized resonator, rotating in opposite directions and having resonance frequencies w+ and $\omega^-$, respectively.

Figure 3:
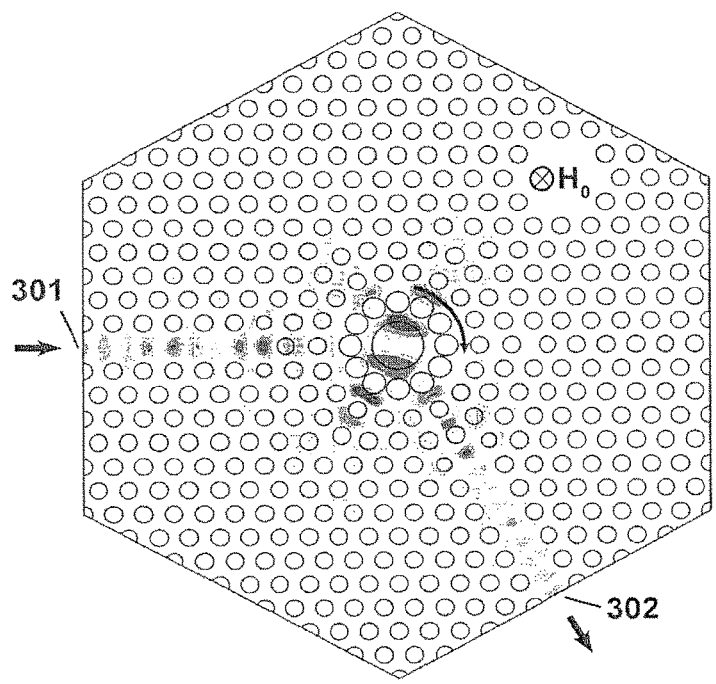

FIG. 3 shows a top view of the device operating in state on. The photonic crystal in which the device is based, the rectilinear waveguides 301 and 302 (input and output, respectively), the resonant cavity in which the dipole modes are excited and the $H_z$ component of the electromagnetic signal, transferred from input to output, are shown, in the normalized central frequency $\omega a/2\pi c$=0.30235, where: w is the angular frequency (in radians per second); a is the lattice constant of the Crystal (in meters); c is the speed of light in free space (approximately equal to 300.000.000 meters per second).

Figure 4:
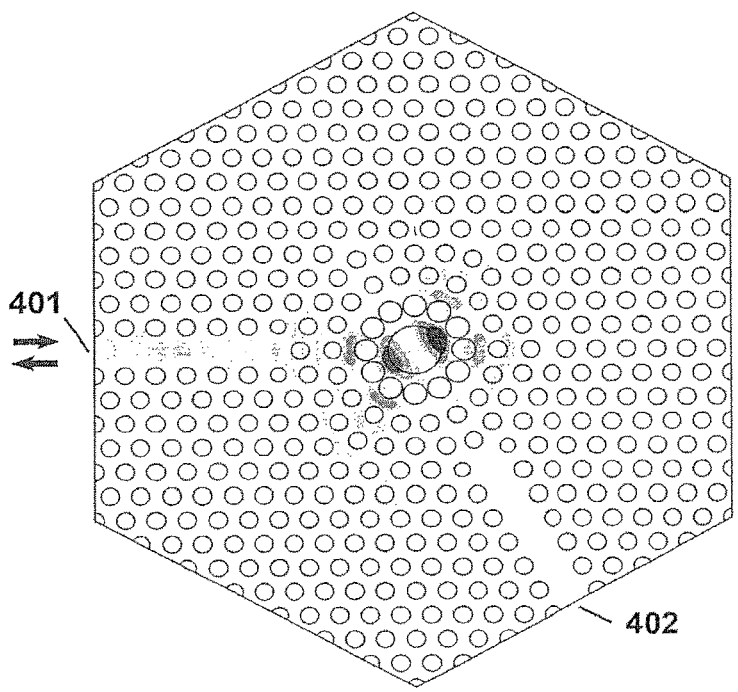

FIG. 4 shows a top view of the device operating in state off. The photonic crystal in which are inserted the resonant cavity and the waveguides 401 (input) and 402 (output) are shown, as well as the $H_z$ component of the electromagnetic signal, which is reflected back to the input, in the normalized central frequency $\omega a/2\pi c$=0.30235.

Figure 5:
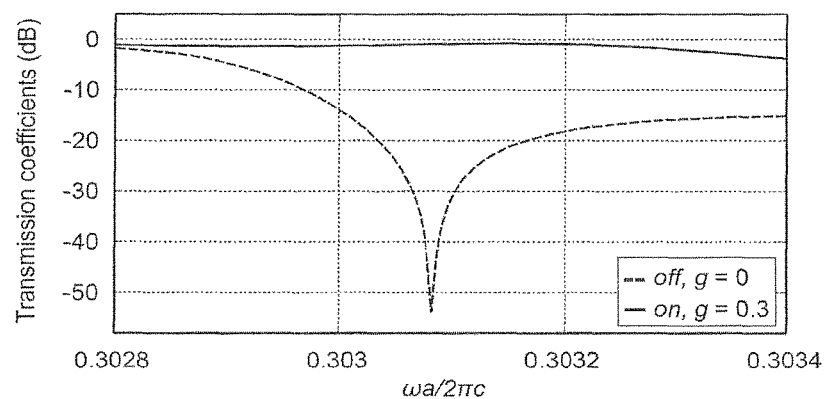

FIG. 5 presents the transmission curves of the switch operating in states on and off.

When the switch is under the influence of an external DC magnetic field $H_0$ (FIG. 1a), an electromagnetic signal in the input waveguide 101 excites, in the resonant cavity, a rotating dipole mode 103. This mode makes the incident signal to be transferred to the output waveguide 102. This is the state on and, in this case, the value of the parameter g is equal to 0.26.

On the other hand, considering the case in which an external DC magnetic field is not applied to the switch (FIG. 1b), an electromagnetic signal incident at the input waveguide 104 excites, in the resonant cavity, a stationary dipole mode 106, whose nodes are aligned with the output waveguide 105. In this case, the incident signal is totally reflected back to the input and there is no transmission of the signal. This is the state off and the value of the parameter g is equal to 0.

The analysis of the behavior of the magneto-optical resonator without loads, i.e., without the connection of input and output waveguides, allows the understanding of the behavior of the device in the two states of operation. In the nonmagnetized case, there are six stationary dipole modes $V_i$ (i=1, 2, . . . , 6), with resonant frequency $\omega_0$. Both $V_1$ and $V_2$ modes are shown in FIGS. 2a and 2b, respectively. Others $V_i$ modes can be obtained by rotating the first and the second modes by 60 and 120 degrees, respectively, in relation to z axis.

$V_i$ modes can be combined in a way that degenerate rotating dipole modes $V^-$ and $V^+$ can be produced, with resonant frequency $\omega_0$ and rotating in opposite directions (FIG. 2c).

Application of an external DC magnetic field $H_0$ on the magneto-optical material in which is based the resonant cavity, oriented along the z axis, causes the removal of degeneracy of the modes $V^-$ and $V^+$, i.e., they now have distinct resonance frequencies $\omega^-$ and $\omega^+$. This situation is illustrated in FIG. 2d, where the $V_m^-$ and $V_m^+$ modes, originated from $V^-$ and $V^+$, are nondegenerated.

The connection of the two waveguides to the resonant cavity, in both non magnetized and magnetized cases, is also responsible for removing the degeneracy of dipole modes. The higher the coupling between the cavity and the waveguides the higher the difference between the resonance frequencies of the previously degenerate modes.

The state on is obtained when an external DC magnetic field H$_0$(FIG. 3) is applied on the device. In this situation, one of two rotating dipole modes V$_m^-$ or V$_m^+$ is excited in the resonant cavity, making possible the transfer of the input signal to the output.

The state off is obtained when an external DC magnetic field is not applied on the device (FIG. 4). In this case, a stationary dipole mode, derived from the combination between the V$_i$ modes, is excited in the resonant cavity. The resulting mode has the nodes aligned with the outgoing waveguide of the device, preventing the transfer of the input signal to the output.

Transmission curves in the two operating states are shown in FIG. 5. The operating bandwidth, considering the levels −2 dB of the insertion losses curve (transmission coefficient in state on) and −15 dB of the isolation curve (transmission coefficient in state off), is 146 GHz. In the normalized central frequency ωa/2πc=0.30235, the insertion losses are −1.5 dB and the isolation between the input and output ports is −53 dB.

The invention claimed is:

1. A compact optical switch based on a two-dimensional photonic crystal with 120 degree bending, based on a two-dimensional photonic crystal in which defects are inserted, in a controlled way, originating two waveguides and one resonant cavity in a magneto-optical material, characterized by controlling the flow of an electromagnetic signal along an optical communications channel, interrupting or allowing the passage of the signal in accordance with the application of applied external DC magnetic field, and further characterized by presenting, in the normalized central frequency ωa/2πc=0.30235, insertion losses (transmission coefficient in state on) equal to −1.5 dB and isolation between the input and output ports (transmission coefficient in off state) equal to −53 dB, while the operating bandwidth is equal to 146 GHz, considering the levels −2 dB and −15 dB of the insertion losses curve and isolation curve, respectively.

2. The compact optical switch based on a two-dimensional photonic crystal with 120 degree bending in accordance with claim 1, characterized by promoting the change of the propagation direction of an electromagnetic signal by an angle of 120 degrees in state on, providing greater flexibility in the development of integrated optical systems.

3. The compact optical switch based on a two-dimensional photonic crystal with 120 degree bending in accordance with claim 1, characterized by operating, in state off (nonmagnetized case), with stationary dipole modes whose nodes are aligned with the output waveguide and, in state on (magnetized case), with rotating dipole modes.

4. The compact optical switch based on a two-dimensional photonic crystal with 120 degree bending in accordance with claim 2, characterized by operating, in state off (nonmagnetized case), with stationary dipole modes whose nodes are aligned with the output waveguide and, in state on (magnetized case), with rotating dipole modes.

5. A compact optical switch based on a two-dimensional photonic crystal with 120 degree bending, based on a two-dimensional photonic crystal in which defects are inserted, in a controlled way, originating input and output waveguides and one resonant cavity in a magneto-optical material, characterized by controlling the flow of an electromagnetic signal along an optical communications channel, wherein under the influence of an external DC magnetic field, the electromagnetic signal is transferred from the input waveguide to output waveguide, and wherein without the influence of an external DC magnetic field, the electromagnetic signal is reflected back onto itself from the input waveguide.

6. The compact optical switch based on a two-dimensional photonic crystal with 120 degree bending in accordance with claim 5, characterized by promoting the change of the propagation direction of an electromagnetic signal by an angle of 120 degrees in state on, providing greater flexibility in the development of integrated optical systems.

7. The compact optical switch based on a two-dimensional photonic crystal with 120 degree bending in accordance with claim 5, characterized by operating, in state off (nonmagnetized case), with stationary dipole modes whose nodes are aligned with the output waveguide and, in state on (magnetized case), with rotating dipole modes.

8. The compact optical switch based on a two-dimensional photonic crystal with 120 degree bending in accordance with claim 6, characterized by operating, in state off (nonmagnetized case), with stationary dipole modes whose nodes are aligned with the output waveguide and, in state on (magnetized case), with rotating dipole modes.

* * * * *

UNITED STATES PATENT AND TRADEMARK OFFICE
CERTIFICATE OF CORRECTION

PATENT NO. : 10,331,009 B2
APPLICATION NO. : 15/313133
DATED : June 25, 2019
INVENTOR(S) : Dmitriev et al.

It is certified that error appears in the above-identified patent and that said Letters Patent is hereby corrected as shown below:

On the Title Page

Item (54), and in the Specification, Column 1, Line 1, Title, "COMPACT OPTICAL KEY BASED ON A TWO-DIMENSIONAL PHOTONIC CRYSTAL WITH 120 DEGREE FOLDING," should be -- COMPACT OPTICAL SWITCH BASED ON A TWO-DIMENSIONAL PHOTONIC CRYSTAL WITH 120 DEGREE FOLDING --.

Signed and Sealed this
Twenty-sixth Day of November, 2019

Andrei Iancu
*Director of the United States Patent and Trademark Office*